United States Patent [19]

Bahloul

[11] Patent Number: 4,718,787
[45] Date of Patent: Jan. 12, 1988

[54] CONNECTOR FOR SCAFFOLDING OR SIMILAR STRUCTURE AND PROCESS OF ASSEMBLY THEREOF

[75] Inventor: Kamel Bahloul, Boulogne, France

[73] Assignee: Cegedur Societe de Transformation de l'Aluminium Pechiney, Paris, France

[21] Appl. No.: 832,900

[22] Filed: Feb. 26, 1986

[30] Foreign Application Priority Data

Feb. 27, 1985 [FR] France ................... 85 03319

[51] Int. Cl.⁴ .................................. E04G 7/00
[52] U.S. Cl. ......................... 403/175; 403/49; 403/246; 182/179
[58] Field of Search ............... 403/49, 175, 174, 245, 403/246, 189, 190, 230, 334, 333, 361, 404; 182/178, 179

[56] References Cited

U.S. PATENT DOCUMENTS

| 148,061 | 3/1874 | Holden | 403/383 X |
|---|---|---|---|
| 895,578 | 8/1908 | McNamara | 403/49 X |
| 1,918,116 | 7/1933 | Mansfield | 403/175 X |
| 2,810,598 | 10/1957 | Lief | 403/334 |
| 4,044,523 | 8/1977 | Layher | 403/49 X |
| 4,094,417 | 6/1978 | Cairnes et al. | 403/175 X |
| 4,152,086 | 5/1979 | Achenbach et al. | 403/361 X |
| 4,236,439 | 12/1980 | Imai | 403/324 X |
| 4,273,463 | 6/1981 | Dobersch | 403/49 X |
| 4,439,052 | 3/1984 | Wallther | 403/49 |
| 4,530,616 | 7/1985 | Roux | 403/49 |

OTHER PUBLICATIONS

Portable Aluminum Scaffolds; by Up-Right Scaffolds, Berkeley, Calif., pp. 1-12; 12/6/72.

Primary Examiner—Randolph A. Reese
Assistant Examiner—Joseph A. Fischetti
Attorney, Agent, or Firm—Oblon, Fisher, Spivak, McClelland and Maier

[57] ABSTRACT

A connector for scaffolding or similar structure permitting vertical poles to be connected to longitudinal transverse members or bars includes a star-shaped portion with a central bore having a plurality of arms which at their ends each carry a pyramid-conical opening into which engages a pyramid-conical or conical hook. A clip which is movable about a horizontal axis makes it possible to avoid accidental dismantling of the assembly.

17 Claims, 4 Drawing Figures

CONNECTOR FOR SCAFFOLDING OR SIMILAR STRUCTURE AND PROCESS OF ASSEMBLY THEREOF

BACKGROUND OF THE INVENTION

1. Field of the Invention

The invention relates to a connector for scaffolding or a similar structure permitting vertical poles to be connected to horizontal transverse members and/or bars. The connector may also serve as a connecting element between the poles and the inclined bracing bars of the scaffolding.

2. Description of the Prior Art

In known designs, a scaffolding connector generally has an apertured portion in the form of a star, which is fixed to the vertical pole, and a cap member which is fixed to the end of the horizontal transverse members and/or bars, with the assembly being held together by a wedge-shaped key.

Such connectors therefore require three components of different shapes.

Moreover, when the scaffolding, as considered in plan view, has parts angled to one another by other than 0° or 90°, cap members of a specific shape are then required.

SUMMARY OF THE INVENTION

The problem that the invention seeks to solve is that of simplifying such scaffolding connectors by reducing to two the number of components necessary for mechanically connecting the vertical poles and horizontal transverse members or bars, a minor modification in the shape of one of the components further making it possible to make inclined angular connections (as considered in plan).

For the sake of facility of description, the components will be assumed to be in their position of use and the poles, bars and transverse members will be assumed to be cylindrical tubes. However, tubes of other cross-sections (square, polygonal, rectangular, etc...) may be used by modifying the corresponding shapes described.

According to the invention the connector includes a star-shaped element or portion which is provided at its center with a circular opening having a vertical axis, and which carries at the end of each of its arms a pyramid-conical cavity or opening, the axis of which is parallel to that of the central opening and whose base is directed upwardly.

The pyramidal and conical surfaces which form the pyramid-conical opening preferably have the same axis. The corners of the pyramid are tangential or external to the cone, the latter being in secant or tangential relationship to the pyramidal surface. The side surface of the cavity may therefore assume any pyramid-conical shape combination from that of a simple cone (inclusive) to that of a simple pyramid (exclusive).

The central opening which is of a cylindrical general shape has at least one horizontal annular bead which is interrupted by at least one notch, the inside diameter of the bead being equal to or slightly greater than the outside diameter of the corresponding pole, which has a shape corresponding to that of the bead and notches. This permits the star-shaped portion to be longitudinally and rotationally fixed to the pole. A hooking element or portion has a connecting sleeve for connection to a horizontal bar (or transverse member) and a pyramid-conical hook which may be complementary in shape to the pyramid-conical openings at the ends of the arms of the star-member.

When an angular connection (as considered in plan) is desired, the hook is then formed purely conical, even if the openings are not purely conical. The connecting sleeve has at least one annular groove and at least one flat portion permitting it to be rigidly fixed in the longitudinal direction in respect to rotation about its axis, to the corresponding bar or transverse member. When the bars or transverse members are polygonal, there is no need to provide the flat.

The hooking portion further has a safety device to prevent accidental disassembly, formed by a clip which is movable about a horizontal axis which is fixed with respect to the upper part of the pyramid-conical hook and whose lower limbs are disposed "at rest" beneath the end of the arm of the star portion.

To facilitate setting horizontal bars or transverse members in position, the ends of the arms of the star-shaped portion are provided with a bevel or inclined surface which is at an angle ($\alpha$) of between 10° and 80° to the horizontal. Accordingly, when producing the the hooking engagement, the clip naturally turns about its axis in an outward direction, slides along the end of the star portion, then returns to a position beneath the arm solely under the effect of its own weight, where it then provides a connection which cannot accidentally come undone. Therefore, dismantling of the connector requires intentional disengagement of the clip, by rotating it about its axis, from the end of the arm of the star portion, in the recess provided between the sleeve and the pyramid-conical hook of the hooking portion.

The star-shaped portion and the hooking portion may be made of suitable material such as steel, Al alloys etc. However, when Al alloys are used, it is preferable to position a steel insert on the axis of the pyramid-conical hook, the insert projecting at the two ends, in order better to resist the shocks to which the assembly is subjected when it is set in position and/or dismantled.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 2:
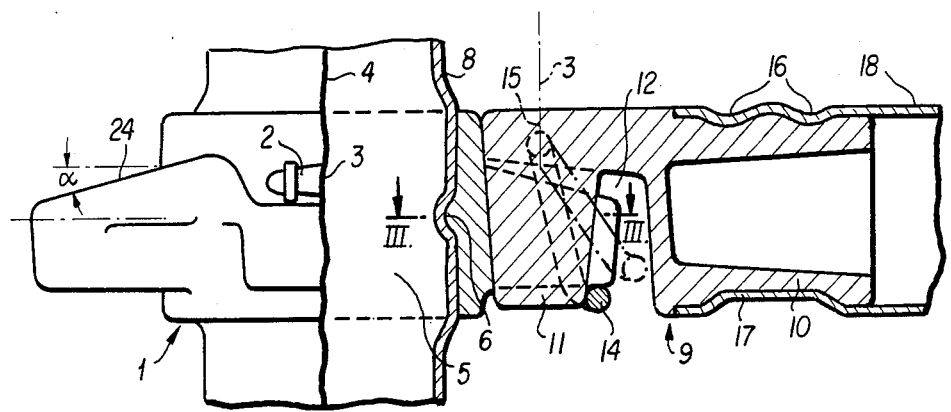
FIG. 2 shows, on the left, an elevational view of half of an assembly connector according to the invention, and on the right, a view of half of the connector in axial section taken along line II—II in FIG. 1.
Figure 1:
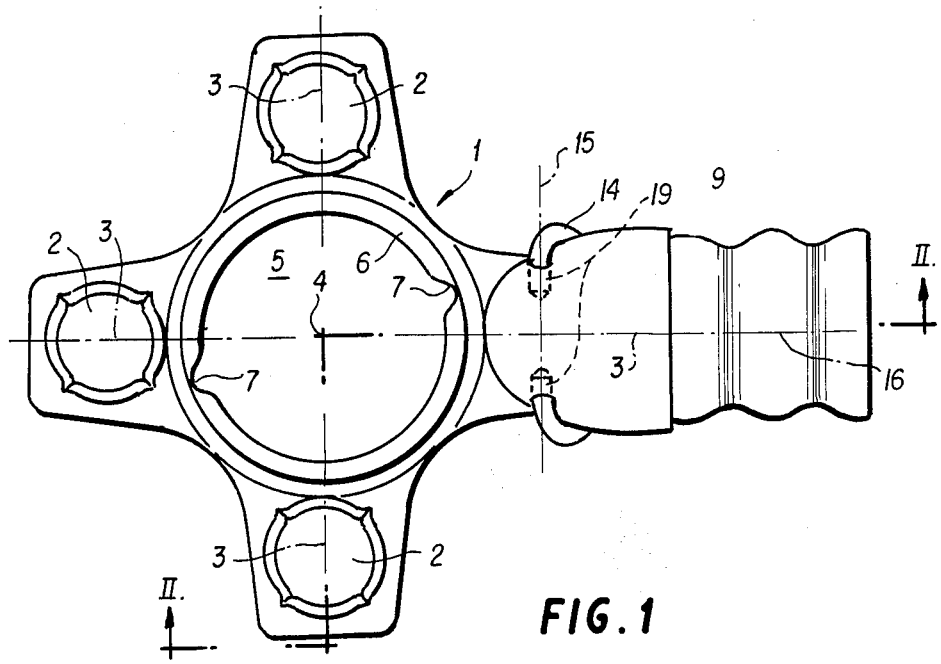
FIG. 1 shows a plan view of the FIG. 2 assembly; excluding the horizontal bar.

The star-shaped portion 1 has four arms 1A which are each provided at their ends with a pyramid-conical cavity 2, the central axes 3 thereof being parallel to the axis 4 of the central opening 5 in the star-shaped portion 1. The upper part of each arm 1A forms a bevel (or inclined surface) 24, the slope (α) of which relative to the horizontal is 17°.

The central opening 5 which is generally of a cylindrical shape has an annular bead 6 having a diameter smaller than the opening 5. The bead 6 is interrupted by two longitudinal notches 7. The pole 8 fits into the opening 5 and has a shape complementary to that of the opening. When the pole 8 is not circular in shape, the notches 7 may be omitted.

The pole 8, whose outer diameter is initially smaller than the inner diameter of the bead, is preferably fixed to the central opening 5 of the star-shaped portion 1 by magneto-forming, but it may also be fixed in position by mechanical expansion of the pole.

The hooking portion 9 includes a sleeve 10 and a pyramid-conical hook 11 which are connected by an upper bridge portion and which are separated by a lower recess 12.

Figure 3:
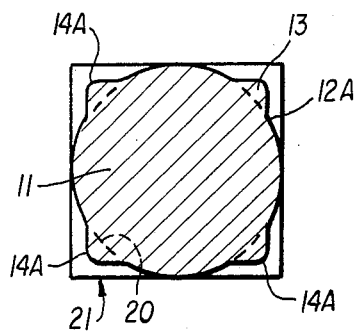
FIG. 3 is a view taken along line III—III in FIG. 2.

The hook 11 has a shape in section (FIG. 3) which corresponds to that of the cavities 2, i.e., the combination of a truncated cone 12A and a truncated pyramid 13 having the same axis, the same apex and being in secant relationship; the corners 14A of the truncated pyramid 13, which are generally rounded, are therefore external to the surface 20 of the cone 12A. The hook 11 has the same taper as that of the cavities 2 so that it can fit snugly therein.

The hook 11 need not have the same shape in section as its corresponding cavity 2. For example, if it is desired to permit relative rotation of the hook and cavity, the hook may be entirely of a cone shape having the surface 20. Reference numeral 21 in FIG. 3 refers to a possible shape for the hook portion which is entirely a truncated pyramid.

The hook 11 has in its upper part two oppositely disposed bores 19 into which engage the ends of the safety clip 14. The safety clip 14 can therefore pivot about the axis 15 towards the recess 12 to release the end of the arm of the star-shaped portion 1.

The sleeve 10 has two annular grooves 16 and a flat 17 on to which the horizontal bar 18 is fixed. The overall diameter of the sleeve is equal to or slightly less than the inside diameter of the tube (bar or transverse member).

The tubular bar 18 is preferably fixed on the sleeve by magneto-forming but it may also be fixed in position by mechanical hammering or constriction of the tube.

Figure 4:
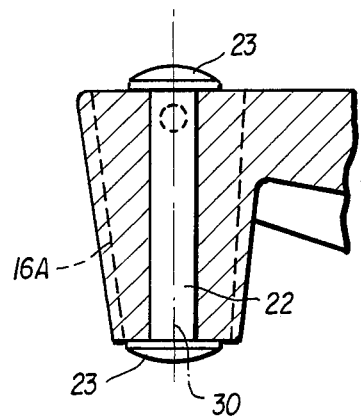
FIG. 4 is an axial section of a pyramid-conical hook made of Al alloy and containing a steel insert.

FIG. 4 shows the pyramid-conical hook 11 of a hooking portion 9 made of cast Al alloy, for example AS13G, on a steel insert 22 for example of 18-10 stainless steel which is disposed on the longitudinal axis 30 of the hook and which projects at the two ends thereof in the form of two curved heads 23. Reference numeral 16A indicates the edges of the corners of the truncated pyramid portion of the hook.

The assembly connector according to the invention has the following advantages over the known arrangements:
 1. It is easy to fit, and
 2. It is secure against accidental dismantling.

This arrangement may also be used for similar structures such as shelving assemblies, pigeonholes or rack structures, display units, dismantlable supports, podiums, etc.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A scaffolding connector comprising:
   a star-shaped element having a central bore through which a vertical pole may be inserted, and having a plurality of arms having openings therein, and
   hooking elements connectable to transverse scaffolding members, and each of said hooking elements having hooks fittable in said openings,
   wherein an interior surface of said openings and an exterior surface of said hooks each have a pyramid-conical shape, said pyramid-conical shape comprising a pyramid and cone superimposed on one another such that a periphery of a section transverse to a longitudinal axis of one of said hooks and through said one of said hooks, as well as a periphery of a section transverse to a central axis of one of said openings and through said one of said openings, has at least one of conical shape portions and pyramid shape portions.

2. The connector of claim 1, wherein a pyramid shape defining said pyramid shape portions is in secant relationship to a cone shape defining said conical shape portions and external thereto such that said transverse section has alternating conical shape portions and pyramid shape portions.

3. The connector according to claim 1 wherein said hooks are frustoconical.

4. The connector of claim 2 wherein said conical and pyramid shapes have axes which are coaxial and parallel to the length of said pole.

5. The connector of claim 2 wherein said pyramid and conical portions have the same apex.

6. The connector of claim 1 including a safety clip pivoted to each said hooking element about a horizontal axis, and engageable with one said arm when said hook is in said opening of said one said arm.

7. The connector of claim 1, wherein an upper end of each said arm defines a bevel or inclined surface extending at an angle of from 10° to 80° to the horizontal.

8. The connector of claim 1, including at least one internal annular bead in said central bore of the star-shaped element.

9. The connector of claim 8, wherein said internal bead has at least one axial notch.

10. The connector of claim 1, including a connecting sleeve for each said hooking element, each said connecting sleeve having at least one external transverse circular groove.

11. The connector of claim 10, wherein each said connecting sleeve has an external longitudinal flat.

12. The connector of claim 1, wherein said hooking elements are formed of Al alloy and include an axial insert which projects therefrom at two ends thereof.

13. The connector of claim 1, wherein a pyramid shape defining said pyramid shape portions is in tangential relationship to a cone shape defining said conical shape portions and external thereto such that said transverse section is pyramidal.

14. The connector of claim 1, in combination with said pole fitted in said central bore and fixed to said star-shaped element by magneto-forming.

15. The connector of claim 1, in combination with said pole fitted in said central bore and mechanically fixed to said star-shaped element.

16. The connector of claim 1 including sleeves mechanically fixed to said hooking elements and scaffolding members for connecting said hooking elements to said scaffolding members.

17. The connector of claim 1 including sleeves fixed to said hooking elements and scaffolding members by deformation of said sleeves by magneto-forming for connecting said hooking members to said scaffolding members.

* * * * *